G. M. BALL.
PARACHUTE VENT.
APPLICATION FILED SEPT. 22, 1920.
1,427,771.
Patented Sept. 5, 1922.
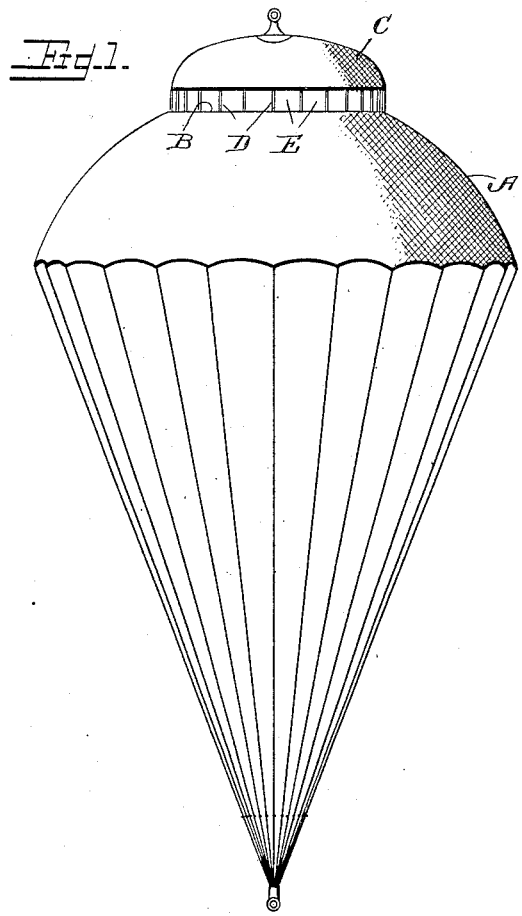
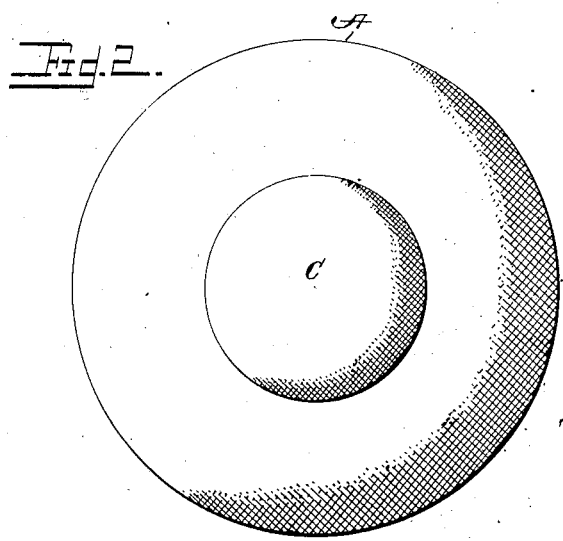

Patented Sept. 5, 1922.

1,427,771

UNITED STATES PATENT OFFICE.

GUY M. BALL, OF SPOKANE, WASHINGTON.

PARACHUTE VENT.

Application filed September 22, 1920. Serial No. 411,937.

*To all whom it may concern:*

Be it known that I, GUY M. BALL, a citizen of the United States, residing at Spokane, in the county of Spokane and State of Washington, have invented certain new and useful Improvements in Parachute Vents, of which the following is a specification.

This invention relates to parachutes in general and more particularly to those having vents for the purpose of maintaining lateral stability while in descent.

In the present type of vented parachute, the common practice is to place a vent in the form of a centrally disposed circular aperture, which is necessarily comparatively small in size in order not to lessen the lifting surface as a whole.

It is proposed to provide a more effective means for maintaining stability of the device by means of a ring vent arranged concentrically adjacent the peak of the parachute. It has been found that by this construction an effective means is provided for attaining the above described desired result. The at present preferred embodiments of my invention will be found in the accompanying specification and annexed drawings in which:

Figure 1 is a view in elevation of the parachute showing the ring vent; and

Figure 2 is a top plan view of the parachute showing the ring vent in its circumferential entirety.

As shown in the drawings, A is a parachute having a large centrally disposed aperture B near the peak. Superimposed upon A is an auxiliary parachute C which is closed at its peak and fastened at its lower side and marginal edge by means of flexible connections such as cords D at intervals, to the main parachute A, leaving a space E between the periphery of the aperture B and the lower edge of C, said space E constituting the ring vent. This ring vent may be made any desirable size by adjusting the cords D to expand or contract the space between the members A and C.

The purpose of a vent is the maintenance of lateral stability which it accomplishes by lessening the tendency of the parachute to tip in order to free its lifting surfaces from excess pressure air therein. The larger the aperture is made the greater stability is provided, however, any great increase thereof would decrease the lifting power of the device. The diameter of the vent in the main parachute body A, and the diameter of the auxiliary parachute C are made equal to obtain the best result.

It is therefore proposed to provide a ring vent which is advantageous in providing a sufficient vent without materially lessening the lifting surfaces, and a device less subject to a tendency to tear as the ordinary parachute with ordinary vents disposed centrally or otherwise.

While I have illustrated a particular form of my invention in the accompanying drawings I do not wish to be limited thereto as various other forms might be claimed without departing from the spirit and scope of my invention.

Having described the preferred embodiment thereof, I claim:

A parachute embodying a main parachute body having a central circular unobstructed vent, and an auxiliary parachute body superposed above and in spaced relation to the main parachute body and directly connected along its marginal edge by flexible means to the main parachute body around said vent, the diameter of the vent and the diameter of the auxiliary parachute being equal.

In testimony whereof I have affixed my signature.

GUY M. BALL.